United States Patent [19]

Aalto et al.

[11] Patent Number: 5,185,525
[45] Date of Patent: Feb. 9, 1993

[54] CHANGER MECHANISM FOR INDIVIDUAL MEASUREMENT OF RADIOACTIVE SAMPLES IN A GAMMA COUNTER

[75] Inventors: Juhani Aalto; Seppo Wallenius, both of Turku, Finland

[73] Assignee: Wallac OY, Turku, Finland

[21] Appl. No.: 761,942

[22] PCT Filed: Mar. 21, 1990

[86] PCT No.: PCT/FI90/00070
§ 371 Date: Sep. 23, 1991
§ 102(e) Date: Sep. 23, 1991

[87] PCT Pub. No.: WO90/11535
PCT Pub. Date: Oct. 4, 1990

[30] Foreign Application Priority Data

Mar. 22, 1989 [FI] Finland .................................. 891351

[51] Int. Cl.$^5$ .............................................. G01T 7/08
[52] U.S. Cl. .................................................. 250/328
[58] Field of Search ................... 422/63, 65, 67, 71; 250/328

[56] References Cited

U.S. PATENT DOCUMENTS

| 2,924,718 | 2/1960 | Pacuard et al. | 250/328 |
| 4,122,936 | 10/1978 | Johnson | 250/328 X |
| 4,582,990 | 4/1986 | Stevens | 250/328 |
| 4,924,093 | 5/1990 | Johnson et al. | 250/328 |

FOREIGN PATENT DOCUMENTS

| 1466882 | 1/1967 | France | 250/328 |
| 2307265 | 11/1976 | France | 250/328 |

Primary Examiner—Constantine Hannaher
Assistant Examiner—Edward J. Glick
Attorney, Agent, or Firm—Shea & Gould

[57] ABSTRACT

The invention relates to a changer mechanism for individual measurement of radioactive samples in a gamma counter. The changer mechanism comprises an identifying element for identifying sample containers of different sizes and a transferring device for transferring the sample containers to the measuring unit for measuring, and back therefrom after measuring. According to the invention, the changer mechanism comprises a lifting device having a grip unit for lifting and transferring the sample from the transfer unit to the measuring unit. The grip unit is provided with grip elements for transferring samples of different sizes based on the information obtained from the identifying unit.

9 Claims, 4 Drawing Sheets

CHANGER MECHANISM FOR INDIVIDUAL MEASUREMENT OF RADIOACTIVE SAMPLES IN A GAMMA COUNTER

BACKGROUND OF THE INVENTION

1. Field of the Invention

The invention relates to a changer mechanism for the individual measurement of radioactive samples in a gamma counter, the changer mechanism comprising an identifying element for identifying sample containers of different sizes and a device for transferring the sample to the measuring unit for measuring and back therefrom after measuring.

2. Description of Related Art

Gamma counter measurements of radioactive samples are commonly conducted using either RIA (Radio Immuno Assay) devices, then the question usually being of a mass survey, or research devices, the question being of a single research of a small series only. RIA devices must be fast and therefore they handle several samples simultaneously. A research device need not be so fast but samples may, instead, be in containers or cassettes of different sizes. The radioactive isotope of the samples may also emit high energy radiation and therefore the detector of a research device must be larger and the lead shield must be much better than in a RIA device.

Either well-type or diametrically through hole-type detectors are generally used in counters. Well-type detectors are provided with a hollow, formed in the detector material, in which the sample is inserted. In hole-type detectors a hole goes through the detector material into which the sample is lifted. A well-type detector is easier to manufacture. It also has better efficiency and it is easier to shield than a hole-type detector.

Known gamma counters have been presented e.g. in the US patent publications U.S. Pat. Nos. 4,029,961 and 4,035,642. In these devices the sample vials to be measured have been placed in cassettes of ten vials and the measuring device takes one cassette at a time for measuring. As there are ten gamma detectors in the device, all samples in the cassette can be measured simultaneously. However, this kind of device is only suitable for use in RIA measurements because it would become too large and expensive for use in research if manufactured using known technique. Moreover, one cannot use a well-type detector in this kind of device because the sample is lifted into the detector.

For economical reasons, research devices have only one large and well shielded detector. Since it has not been possible to combine RIA devices and research devices, those isotope laboratories which want to do both RIA counting and actual gamma research have been forced to purchase two separate counters. Therefore, for economical reasons, counters are also manufactured with 1, 2, or 4 detectors. They are larger and better shielded than necessary in actual RIA work and therefore they can, to a certain extent, be also used in research work. However, the drawback in RIA work is lower speed compared to actual RIA devices and limited efficiency in research work. Furthermore, the volume of samples cannot exceed that of RIA samples.

SUMMARY OF THE INVENTION

The object of this invention is to provide a new sample changer mechanism in such a gamma counter wherein sample containers and their cassettes are of different sizes. The sample changer mechanism according to the invention is characterized in that the changer mechanism comprises a grip unit and a lifting device for lifting and transferring the sample from the transfer unit to the measuring unit, and that the grip unit is provided with grip elements for transferring samples of different sizes based on the information obtained from the identifying unit.

The other characteristics of the invention have been set forth in the ensuing claims.

BRIEF DESCRIPTION OF THE DRAWINGS

The invention will be described in the following by means of examples with reference to the accompanying drawings in which.

DESCRIPTION OF THE PREFERRED EMBODIMENTS

Figure 1:
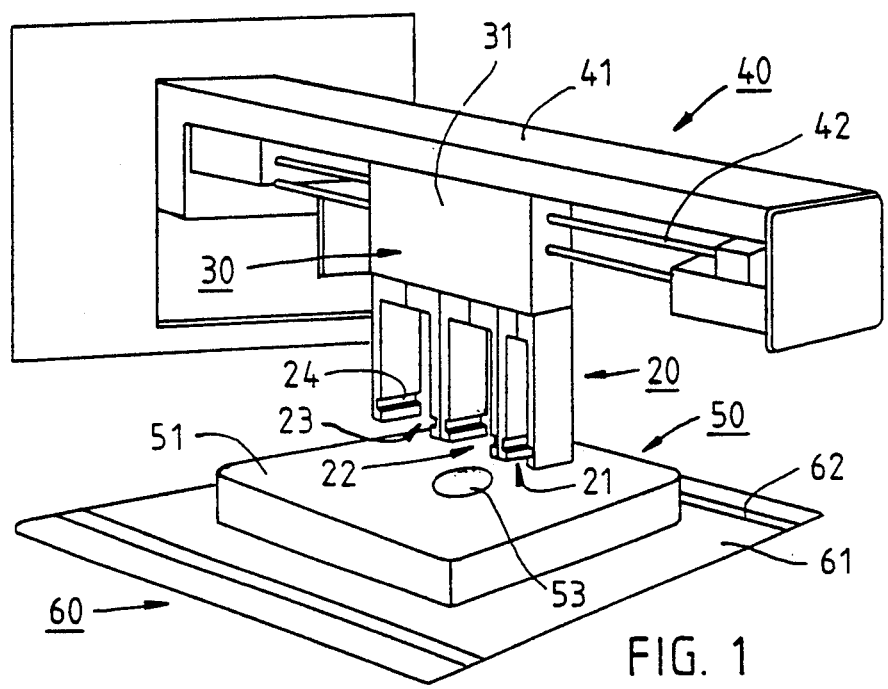
FIG. 1 shows an axonometric view of a gamma counter according to the invention.

FIG. 1 shows an axonometric view of a gamma counter according to the invention, the principal functional parts being a measuring unit 50 and a lifting device 40 consisting of a transfer device unit 30 and a grip unit 20, belonging thereto, for the sample container holders. The transfer device unit 30 is mounted on a cantilever beam 41 integral with vertical part 49 which can be moved in vertical direction in order to lift a sample container holder out of the sample container cassette and to lower it into the measuring unit 50.

The grip unit 20 consists of a slide 31 moving on a horizontal guide bar 42, the slide having three pairs of grip nails 24 attached thereto. These form the three grip elements 21, 22, and 23, being of different sizes, for gripping the holders, being of different widths, of sample containers.

The measuring chamber of the measuring unit 50 is provided with only a single big hole 53 for the detector. The gamma counter in FIG. 1 is, therefore, meant for use in research and it can take sample containers of different sizes in cassettes of different sizes one at a time for analysis. Generally in research use there is no need to measure many samples simultaneously. Instead, the radioactive isotope of the samples may emit high energy radiation and therefore the detector of a research device must be large and the lead shield must be massive and thick-walled.

Operation of the device of FIG. 1 is described in greater detail in the following figures.

Figure 2:
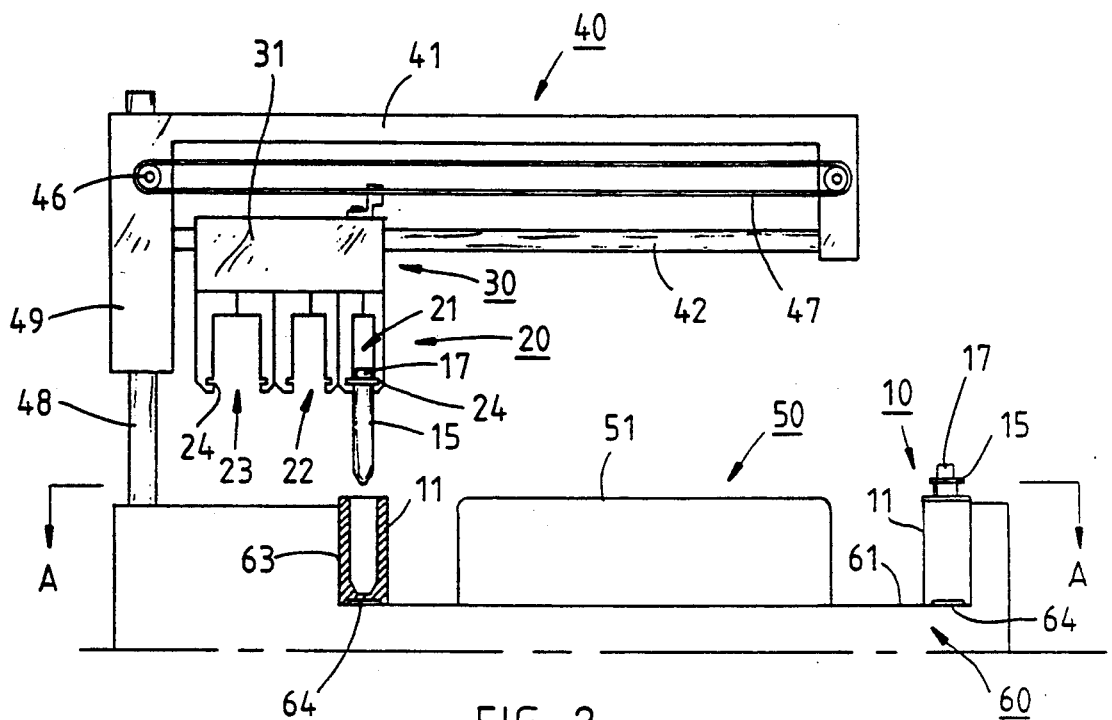
FIG. 2 shows the gamma counter of FIG. 1 viewed from the side.
Figure 3:
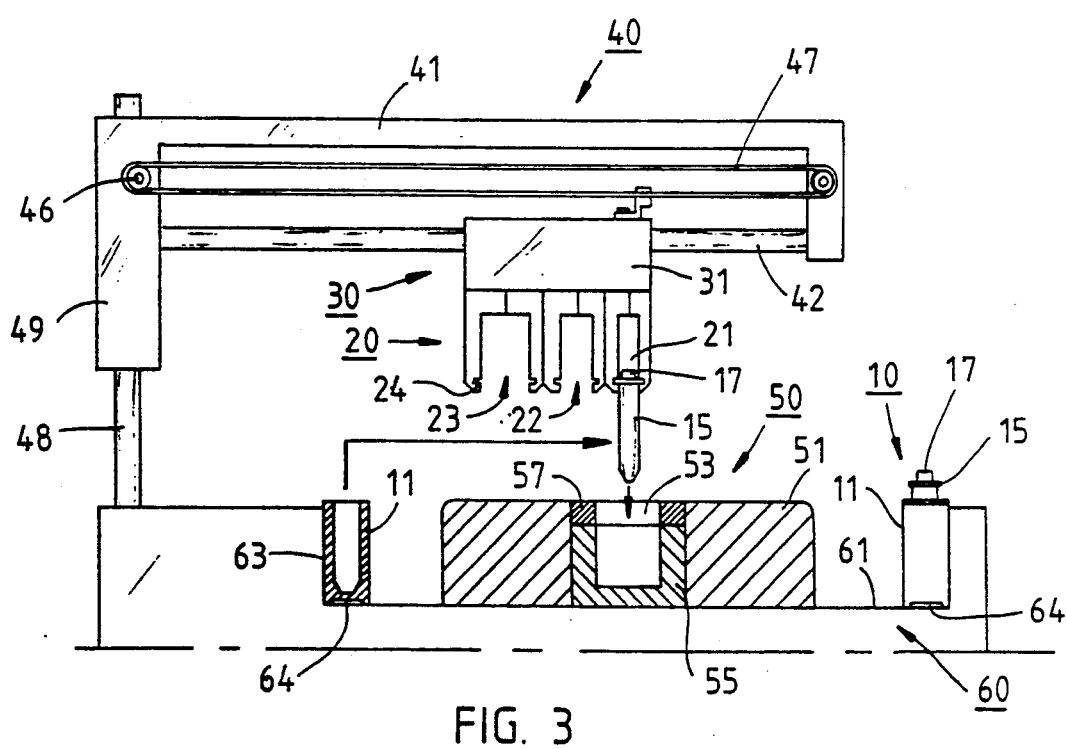
FIG. 3 corresponds to FIG. 2 and shows the gamma counter moving a sample container into the measuring unit.

FIG. 2 shows the main parts of the gamma counter of FIG. 1 viewed from the side. Samples 10, including sample container cassettes 11, which contain sample container holders 15 and, inside them, sample containers 17, are placed in the cassette transfer unit 60 on the measuring table 61, being in connection with a conveyor which moves one cassette at a time to a position for lifting the sample containers. In FIG. 3 its location is in the left corner of the measuring table 61, the cassette 11 being shown as a cross-sectional view. In this gamma counter one can use sample containers and their cassettes of three different sizes because the grip unit 20 has three grip elements 21, 22, and 23 of different sizes.

The lifting device 40 accomplishes the transfer of samples to the measuring unit 50 for measuring. The transfer unit 30 is moved on a horizontal guide bar 42 of the cantilever beam 41 by means of a cogged belt 47 and an electric motor 46. Based on information obtained from a cassette identifier, locating on the cassette path before the measuring point, the slide 31 in the transfer unit 30 moves so that a grip element of the right size is right above the cassette. It can be seen in the figure that the smallest of the grip elements 21, 22, and 23 has been selected i.e. the one with the reference number 21. The grip nails 24 will subsequently lift the sample container holder 15 out of the cassette 11. The vertical movement has been arranged so that the whole cantilever beam 41 rises on the guide bars 48.

FIG. 3 illustrates a situation where the transfer unit 30 of the gamma counter has moved the holder 15 of the sample container in horizontal direction right above the measuring hole 53 of the measuring unit 50. After this the cantilever beam 41 on the whole is lowered, the sample container going down into the measuring hollow 53 having a well-type detector 55. The measuring unit 50 has such a construction that the measuring chamber 51, being made of lead, is provided with a hollow of the same size as the detector 55. The detector has been installed by lowering it downward from above into its hollow and mounting a protective ring 57 on top. The advantage of the construction is that, whenever necessary, one can easily change the detector from above.

Figure 4:
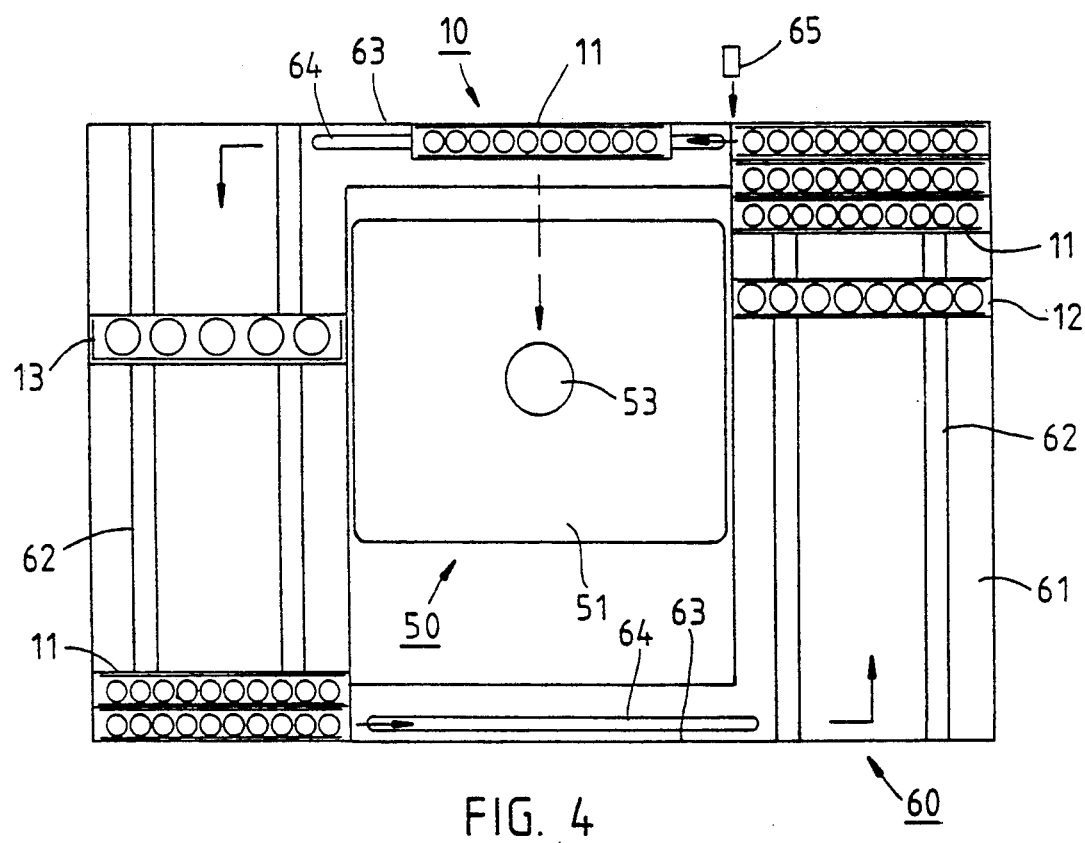
FIG. 4 shows a sectional view taken along the line A—A in FIG. 2.

FIG. 4 shows the gamma counter of FIG. 1 viewed from above. In the figure the table 61, having the measuring unit 50 in the middle, forms the cassette transfer unit 60. The measuring unit has a measuring chamber 51 containing one detector. Sample container cassettes 11, 12, and 13 of different widths are placed on the table 61 where they are transferred in turn for measuring by means of conveyors 62. The cassettes rotate along a path round the measuring unit 50. A transducer 65 for identifying cassettes has been placed on the path, before the measuring point, the transducer identifying the width of the cassette and the size of the sample containers therein and controlling that a suitably sized grip element is transferred close to the sample. This device is suitable for research work where simultaneous measurement of many samples is generally not required, but the detector is large enough and the walls of the measuring chamber are thick enough.

Figure 5:
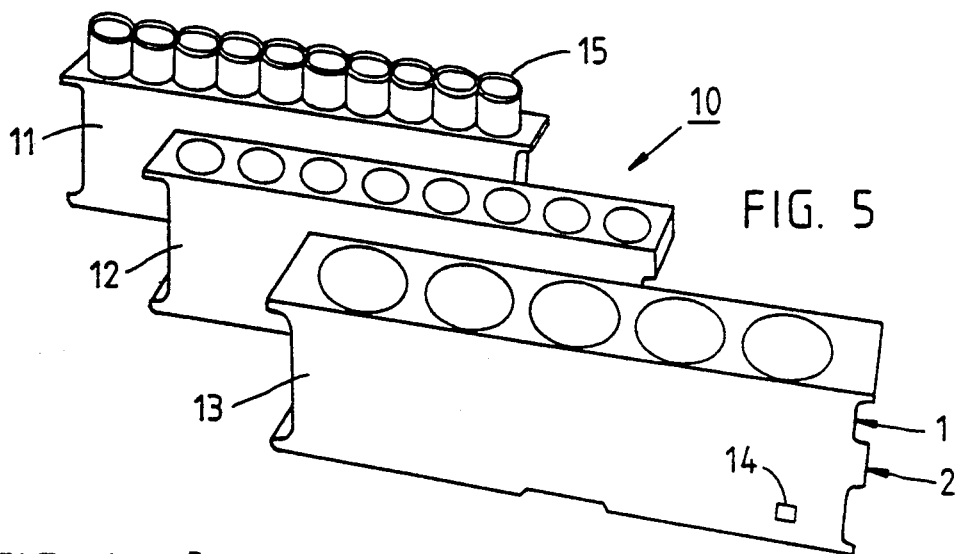
FIG. 5 shows sample container cassettes, being movable on the transfer table, of the gamma counter of FIG. 4.

FIG. 5 shows three sample container cassettes 11, 12, and 13 of different sizes. Their lengths are the same but the widths are different. The width of the cassette defines the size of sample containers it can take. The narrowest cassette 11 can take ten small sample containers along with their holders. The cassette is then provided with the corresponding number of recesses for the sample containers. A medium wide cassette takes eight medium-sized sample containers and the widest cassette takes five wide sample containers. The gamma counter shown in FIG. 1 can measure all sample container sizes mentioned above. To identify cassettes of different sizes the end parts of all cassettes have been provided with identification parts 1 and 2. The transducer, placed in connection with the transfer unit, identifies the width of the cassette by the form of the identification part.

Figures 6, 7:
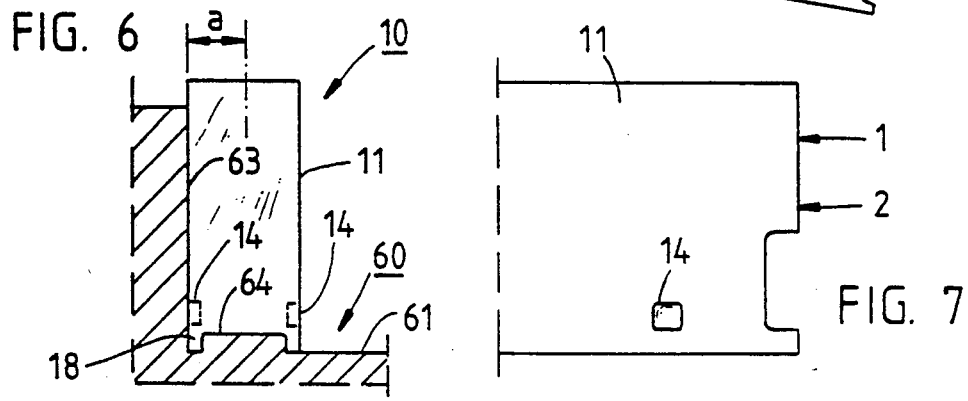
FIG. 6 shows the sample cassette, viewed from the end, at a position where the samples are being lifted into the measuring unit.
FIG. 7 shows the end of the sample cassette of FIG. 6 viewed from the side.

The sample container cassette 11 is schematically shown in FIG. 6 on the table 61 of the transfer unit 60 at a position where the samples are lifted up. It is seen in the figure that there is a guide 64, raising from the surface of the table, formed along the path on the table. A corresponding recess has been formed on the cassette 11 so that, on the lower edge of the cassette, a guide edge 18 is formed, the width corresponding the distance between the guide 64 on the table and the edge 63 of the table. When the guide edge 18 of the cassette moves in the groove between the guide and the table edge, the cassette stays sideways firmly in place with its other side leaning against the edge 63 of the measuring table. The forward transfer movement of the cassette is performed so that the nail of the pulling device inside the table edge 63 grips the opening 14 on the side wall of the cassette. At the same time, this nail of the pulling device, in the opening of the cassette, prevents the cassette from rising, the cassette being held firmly on the path 61 also in vertical direction.

FIG. 7 shows as a side view that end of the cassette which comes first to the place where the samples are to be lifted. As shown in the figure, the cassette is provided with two identification parts 1 and 2 by means of which the transducer 65 shown in FIG. 4 identifies the width of the cassette. In this cassette both parts are closed and so the transducer identifies the cassette to be a thin type. Figure also shows the hole 14 for the nail of the pulling device locating on the side of the cassette.

Figures 8, 9:
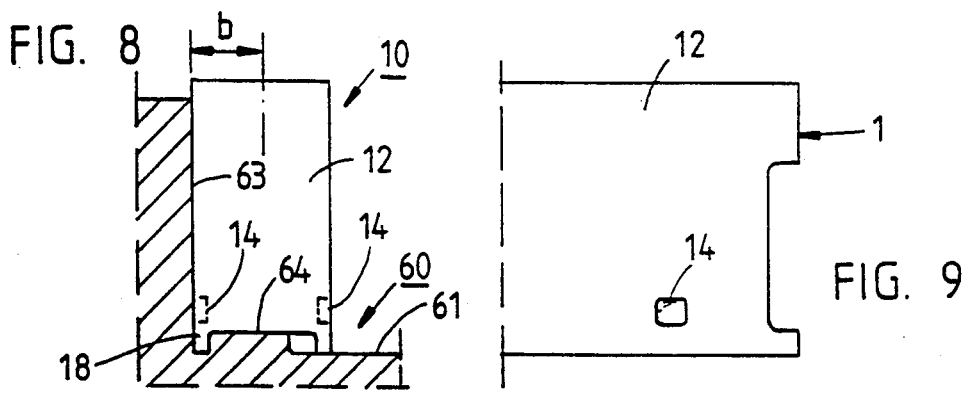
FIG. 8 corresponds to FIG. 6 and shows another embodiment of the sample cassette.
FIG. 9 shows the end part of the sample cassette of FIG. 8 viewed from the side.

FIG. 8 shows a medium wide cassette 12. It is shown in the figure that the guide 64 on table 61 and the nail of the pulling device lock also this cassette firmly in place on the path. This is due to the fact that the guiding edge 18 in the lower edge of the cassette is quite similar to that of a thin cassette, apart from the fact, that the recess under the cassette is wider which is due to the greater width of the cassette. So, one can reliably move cassettes of different widths on the transfer path as long as the width of the guiding edge 18 in their lower edge corresponds to the distance of the guide 64 of the table and the edge 63 of the table from each other.

It can be seen also in FIG. 9 that a medium wide cassette 12 has been marked for the identification transducer in such a way that only the upper identification part 1 is closed.

Figures 10, 11:
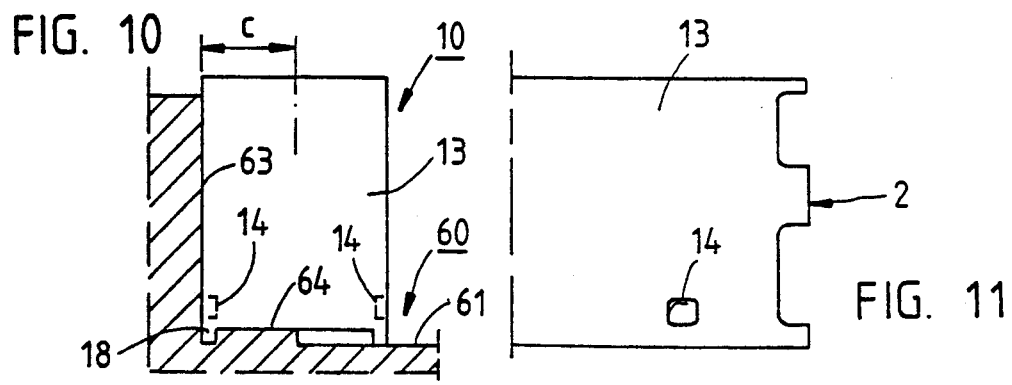
FIG. 10 corresponds to FIG. 6 and shows a third embodiment of the sample cassette.
FIG. 11 shows the end of the sample cassette of FIG. 10 viewed from the side.

FIG. 10 shows a wide cassette 13 whose control is performed exactly in the same way as that of the other cassettes. Only the identification parts are different, as seen in FIG. 11. In this case only the lower identification part 2 is closed.

It can be seen in FIGS. 6, 8, and 10 that the other side of the cassettes 11, 12, and 13 leans against the same edge 63 of the measuring table 61 so that the middle part of a wider sample cassette remains farther away from the edge than that of a narrow cassette. This distance of the middle part from the edge 63 is marked with letters a, b, and c in the figures.

Since the distance of the middle part of the cassette i.e. a,b, and c varies, the cassette transfer unit in a gamma counter of FIGS. 1 and 2 has been designed to operate so that the slide on the horizontal guide bar is controlled by the information obtained from the identification transducer. Firstly, the right grip element is chosen out of the grip units 21, 22, and 23 shown in FIG. 2. After that, the middle part of the chosen grip element is moved to a distance a, b, or c from the edge 63. Now, the cassette can be moved so that the holder of the sample container moves between the nails 24 of the grip element 21 and the lifting of the sample can start thereafter.

It is obvious to a specialist that the different embodiments of the invention can vary within the scope of the ensuing claims.

We claim:

1. Changer mechanism for individual measurement of radioactive samples in a gamma counter, the changer mechanism comprising:
    an identifying element for identifying different sizes of sample containers;
    a device for transferring the sample containers each held within a respective sample container holder to a measuring unit for measuring and back therefrom after measuring, the device for transferring comprising a lifting device having a grip unit for lifting and transferring the sample container holder from a transfer unit to the measuring unit, the grip unit comprising a plurality of grip elements for gripping and transferring sample container holders of different sizes, each of said plurality of grip element corresponding to a different size sample container holder; and
    means for selecting one of said plurality of grip elements to grip and transfer a corresponding sample container holder based on size information obtained from the identifying element.

2. The changer mechanism according to claim 1, wherein each of said plurality of grip elements of the grip unit is provided with grip nails for gripping at least one edge of a respective sample container holder holding a sample container and wherein there are as many grip elements as there are sizes of sample containers.

3. The changer mechanism according to claim 1 or 2 wherein the grip unit of the lifting device is disposed on a horizontal guide bar and is moved on the guide bar according to size information from the identifying element so that a suitably sized grip element is selected to move to a respective sample container holder holding a sample container so as to grip the sample container holder.

4. The changer mechanism according to claim 1 or 2 wherein relative to a horizontal plane, a respective sample container holder holding a sample container is situated principally at the same level when initially gripped by the grip unit and when measured in the measuring unit.

5. The changer mechanism according to claim 3 wherein relative to a horizontal plane, a respective sample container holder holding a sample container is situated principally at the same level when initially gripped by the grip unit and when measured in the measuring unit.

6. The changer mechanism according to claim 1 or 2, further comprising sample container cassettes of different widths holding a plurality of sample container holders on said transfer unit.

7. The changer mechanism according to claim 6, further comprising means for rotating said sample container cassettes along a path of travel on said transfer unit around the measuring unit.

8. The changer mechanism according to claim 7, wherein said identifying element is a transducer positioned along said path of travel of said sample container cassettes.

9. The changer mechanism according to claim 7, wherein each sample container cassette comprises at least one identification part at an end of the cassette such that said identifying element can identify the size of said sample container holders contained therein based on said at least one identification part.

* * * * *